3,563,115
HYDRAULIC CONTROL SYSTEM FOR AUTOMATIC TRANSMISSION

Tetsuya Iijima, Tokyo, and Katsuo Yamada, Yokohama, Japan, assignors to Nissan Jidosha Kabushiki Kaisha, Yokohama, Japan
Filed Dec. 11, 1968, Ser. No. 782,989
Claims priority, application Japan, Dec. 22, 1967, 42/81,843, 42/81,844
Int. Cl. B60k 21/10; F16h 57/10
U.S. Cl. 74—869      4 Claims

ABSTRACT OF THE DISCLOSURE

A hydraulic control system for an automatic transmission for vehicles for performing suitable timing relation of engagement and disengagement of the friction elements while shifting. A valve means is provided to regulate engagement and disengagement timing of an intermediate friction brake at low throttle pressure conditions.

---

Figure 1:
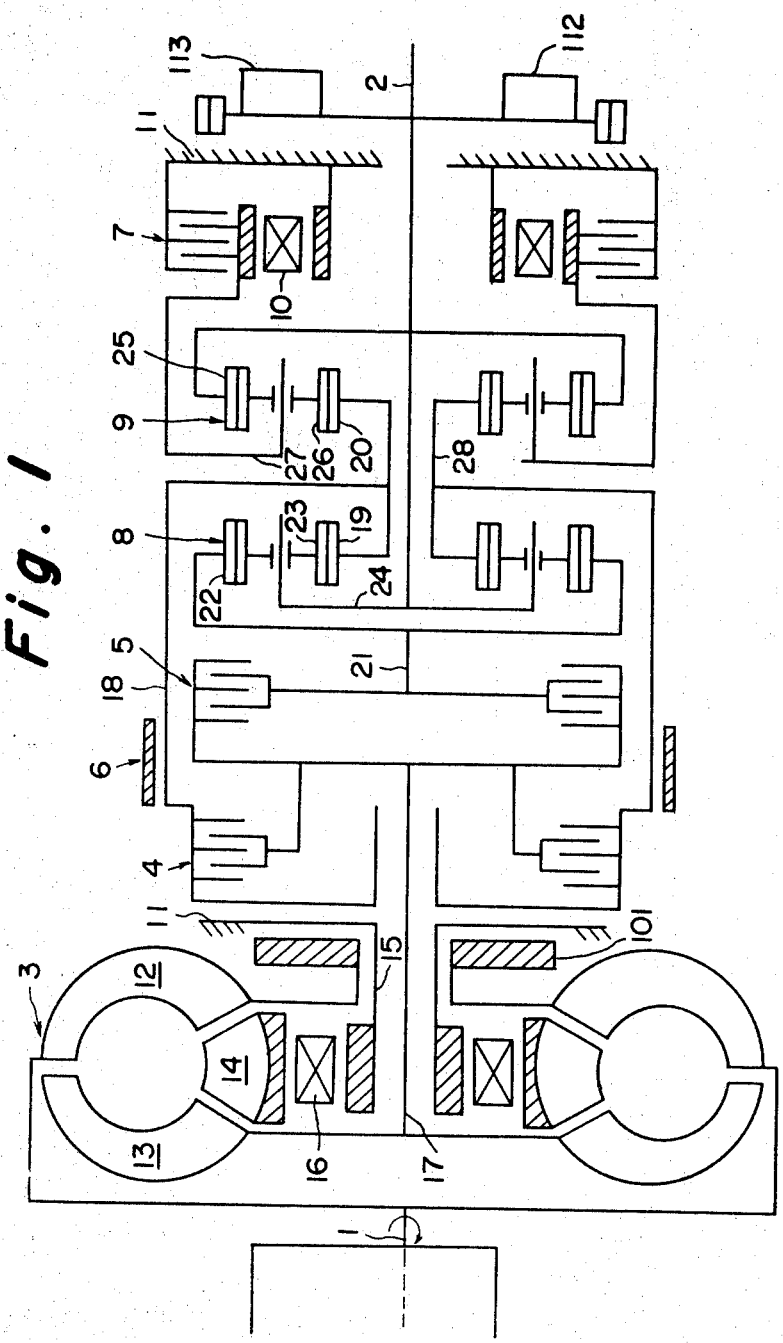

The present invention relates generally to a control system for multiple speed ratios power transmission mechanisms, and more particularly to a hydraulic control system for an automatic transmission of a vehicle, providing an input and an output shaft, at least one planetary gear unit disposed between the shafts, and a plurality of friction elements such as friction brakes and friction clutches, to effect a plurality of gear ratios by selectively engaging or disengaging the friction elements by hydraulic pressure produced in the hydraulic control system.

To attain smooth shifting between a lower gear ratio and a higher gear ratio by the above mentioned automatic transmission, means must be provided to prevent excess shock caused by too much engaging torque capacity of the friction elements or excess slipping caused by too little torque capacity, and further, timing relation between disengagement of one friction element and engagement of other friction element must be carefully determined. The timing relation must be changed corresponding to operating conditions of the vehicle.

The above mentioned automatic transmission further includes a first friction element to attain a higher gear ratio by engagement thereof, a first hydraulic servo to actuate the first friction element, a second friction element to attain a lower gear ratio by engagement thereof, and a second hydraulic servo to actuate the second friction element. The second hydraulic servo disengages the second friction element by a spring force and area difference when the same hydraulic pressure is applied to both sides of the servo piston simultaneously. By proper selection of the spring force and the area difference, timing of the disengagement of the second friction element is determined relative to the engagement of the first friction element. The timing generally accommodates to the full load condition of the engine. However, proper timing relation between engagement of the first friction element and disengagement of the second friction element differs according to operating conditions of the vehicle. However, the above mentioned mechanism cannot be accommodated to all operating conditions, e.g. when the mechanism provides proper timing relation at a full load condition, uncomfortable shock will occur at a light load condition.

For example, when an intermediate gear brake engages at 2nd speed ratio and a direct coupling clutch engages at 3rd speed ratio, at upshift from 2nd to 3rd speed ratio, if both friction elements engage simultaneously, the output shaft is braked, and if both friction elements are disengaged the engine will rotate freely.

In this case, as to the engagement and disengagement timing relation of the friction elements, a proper overlap of engagement of the friction elements will provide smooth upshifting by forcibly rotating the friction elements when engine input torque is high enough. If an instantaneous neutral condition occurs by disengagement of both friction elements, engine speed will increase and result in runaway of the engine.

On the contrary, when the operating condition of the vehicle is at coasting or a low engine driving torque, overlap of engagement of both friction elements will result in a braking action of the output shaft because of low torque and uncomfortable shock will occur. By providing a proper time lag or instantaneous neutral condition between engagement and disengagement of the friction elements, a smooth upshift without any shock or runaway will be performed at the low engine torque operating condition.

Accordingly, it is a primary object of the present invention to provide a hydraulic control system having a simple valve means to control the timing relation between engagement and dis-engagement of friction elements so as to obtain smooth shifting throughout different operating conditions of the vehicle.

More particularly, it is an object of the present invention to provide a hydraulic control system having a simple valve means, the valve spool thereof being shifted by hydraulic control passages to decrease fluid pressure in the engage side fluid chamber of the hydraulic servo of the friction element which is to be disengaged when upshifting from intermediate to high speed ratio at a low torque operating condition so as to perform proper timing relation between engagement and disengagement by quick disengagement of the friction element to accommodate the operating condition.

Thus, by providing overlap of engagement of both friction elements to accommodate a high input torque condition by the transmission mechanism, and by providing the above mentioned valve means according to the invention, to attain quick disengagement of the friction element to accommodate a low torque condition, smooth shifting operation can be attained all through the operating conditions.

Another object of the present invention is to provide the above mentioned valve means, by which fluid pressure is decreased early in the engage side fluid chamber of the hydraulic servo of the friction element which is to be engaged at a downshift from high to intermediate gear ratio at a low torque operating condition, so as to accommodate the timing relation.

A further object of the present invention is to provide the above mentioned valve means in which, at a manual down-shift from high gear ratio to attain an engine braking function, another fluid passage is provided to prevent displacement of the valve spool so that the desired engine braking function is promptly attained.

By providing valve means according to the invention, at light load operating conditions while upshifting from a lower to a higher gear ratio and also downshifting from a higher to a lower gear ratio, the timing relation of engagement and disengagement of the friction elements is regulated to attain smooth shifting and no adverse effect is caused by an engine braking function.

According to another embodiment of the present invention, governor pressure representing vehicle speed and throttle pressure or other fluid pressure signal representing engine torque are introduced as control pressure to actuate valve spools of the valve means, so that a relative function of vehicle speed and engine torque, at a high speed low engine torque operating condition, the engage side fluid chamber of the hydraulic servo for actuating the friction element to be disengaged is communicated to an exhaust port to effect quick disengagement of the friction element, so as to attain a suitable timing relation at a light load operating condition.

Figure 2:
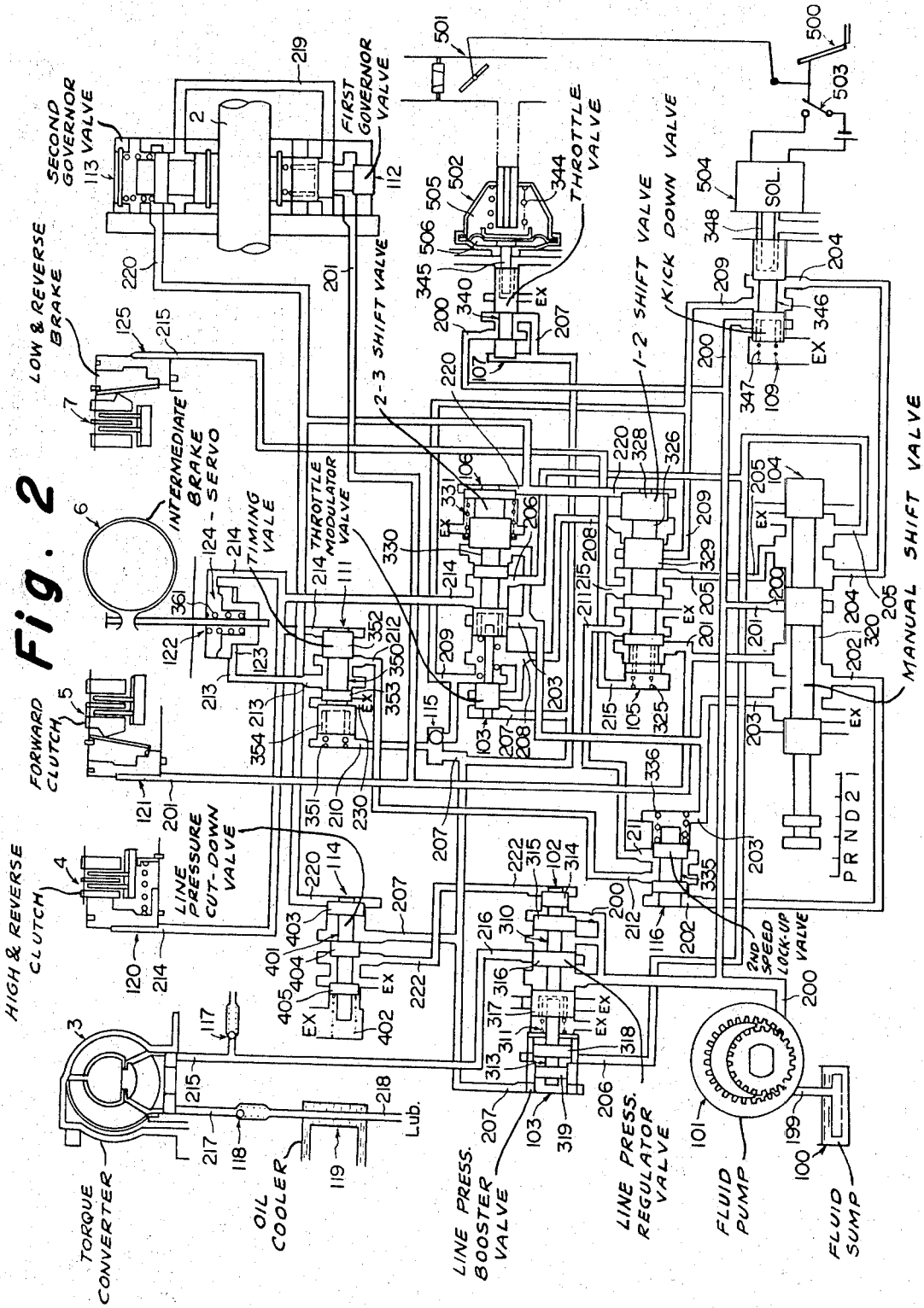
Figure 3:
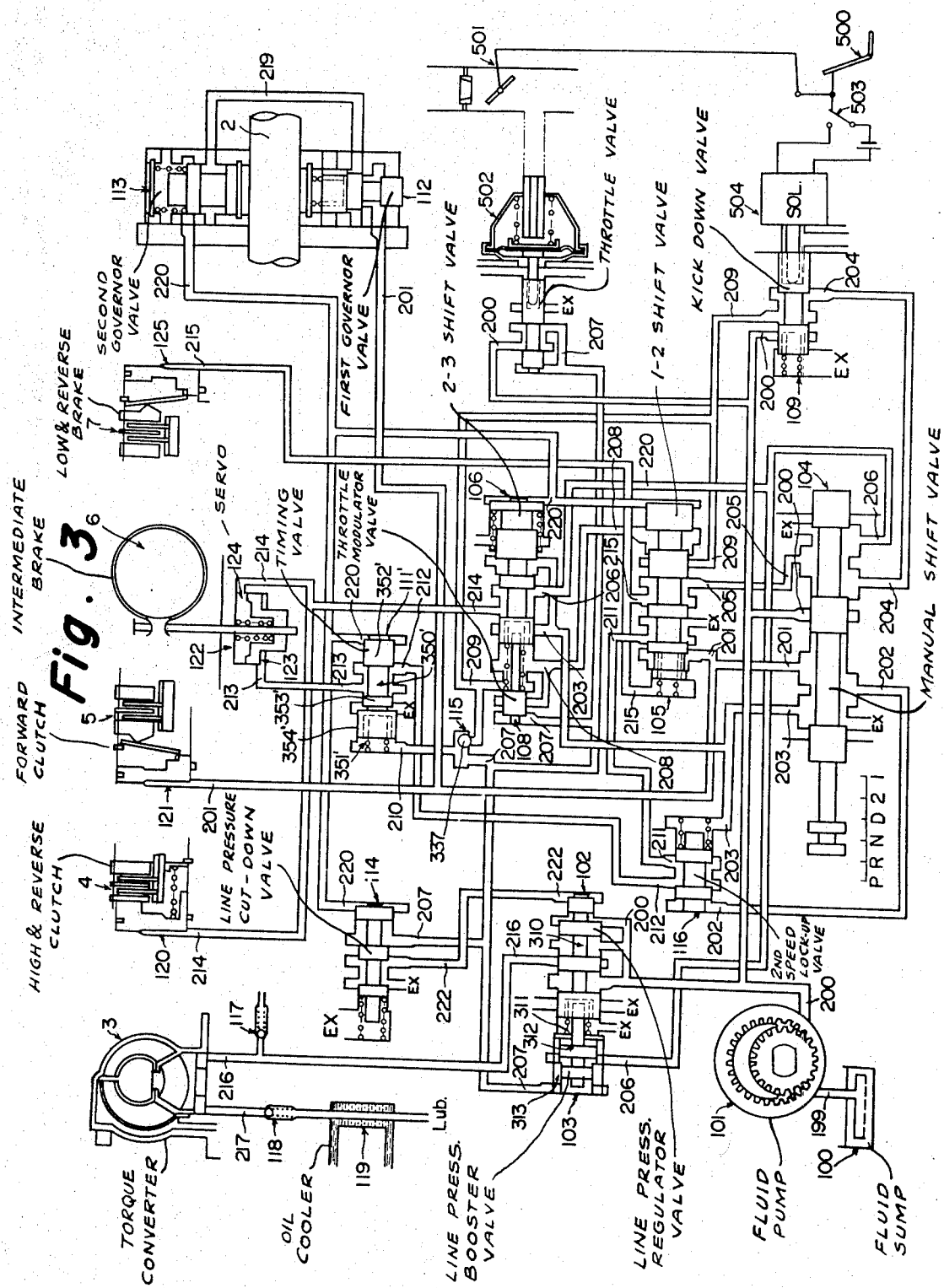
Figure 4:
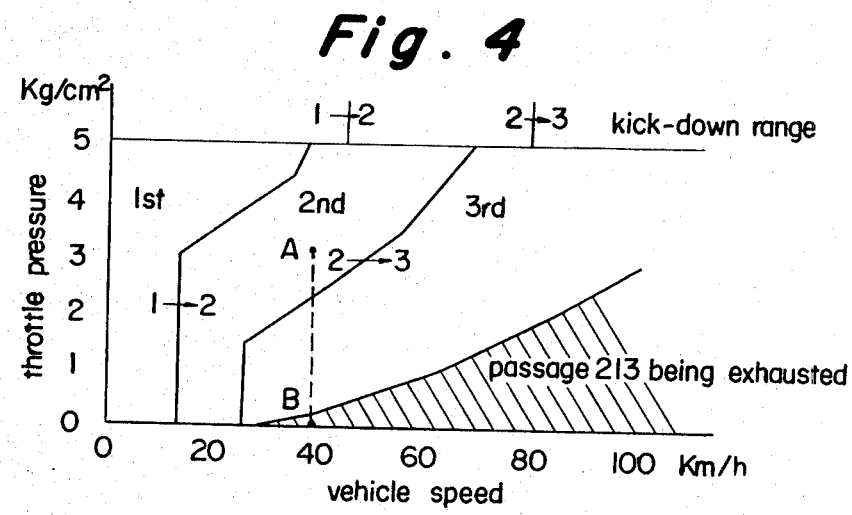

Further and more specific objects, features and advantages of the present invention and the manner in which the invention is carried into practice are made apparent in the following detailed description of the preferred embodiment, by way of example, wherein reference is made to the accompanying drawing, in which:

FIG. 1 shows a diagrammatic illustration of a power transmission mechanism of an automatic transmission of a vehicle, FIG. 2 shows a diagram of one embodiment of a hydraulic control system, according to the invention, to control the transmission shown in FIG. 1, FIG. 3 shows another embodiment of a hydraulic control system, and FIG. 4 shows the actuating range of the timing valve shown in FIG. 3 in relation to upshift characteristics.

In the drawing, the same reference numerals are used for similar parts for the sake of clarity.

FIG. 1 shows in a schematic form a typical power transmission mechanism providing a three element torque converter unit and two planetary gear units. While this is used as an example to describe the invention, it will be understood that the present invention has application to any apparatus comprising a torque converter or a hydraulic coupling unit and a plurality of planetary gear units and providing a hydraulic control system to effect automatic shifting between speed ratios.

The transmission mechanism shown comprises an input shaft 1, an output shaft 2, a torque converter assembly 3, two friction clutches 4 and 5, two friction brakes 6 and 7, each clutch and brake being actuated by hydraulic pressure, two planetary gear units 8 and 9, a one-way brake 10 and a casing 11 accommodating the planetary gear units and the friction elements. The torque converter 3 comprises an impeller 12 connected to the input shaft 1, a turbine 13 which is driven by the impeller 12, and a stator 14 which is connected to a stationary shaft 15 through a one-way clutch 16, and is filled with working fluid transmitting the driving torque. The power transmitted by the engine drive shaft 1 through the impeller 12 and the working fluid to the turbine 13 is transmitted through an intermediate shaft 17 which is connected to the turbine 13 to the friction clutches 4 and 5.

The friction clutch 4 is connected through a drum 18 to sun gears 19 and 20 of the planetary gear units 8 and 9 respectively. The friction clutch 5 is connected through an intermediate shaft 21 to a ring gear 22 of the planetary gear unit 8. A plurality of planet gears 23 meshing with the ring gear 22 and the sun gear 19 are supported by a carrier 24 secured to the output shaft 2 which is also secured to a ring gear 25 of the rear planetary gear unit 9. A plurality of planet gears 26 meshing with the ring gear 25 and the sun gear 20 are supported by a carrier 27 which is connected to the friction brake 7 and the one-way brake 10. The friction brake 7 clamps by engagement thereof the planet gear carrier 27 and the one-way brake 10 permits rotation of the carrier 27 only to the direction of the input shaft 1 indicated by an arrow. The friction brake 6 clamps by tightening to the drum 18 the sun gears 19 and 20 through a hollow transmission shaft 28.

The transmission mechanism shown in FIG. 1 provides three forward and one reverse speed ratios by suitable engagement of the friction elements as shown in Table 1.

TABLE 1

| Speeds | Gear ratio | Friction elements engaged | | | | |
|---|---|---|---|---|---|---|
| | | Clutch 4 | Clutch 5 | Brake 6 | Brake 7 | One-way brake 10 |
| First | 2.45 | — | o | — | — | o |
| Second | 1.45 | — | o | o | — | — |
| Third | 1.00 | o | o | — | — | — |
| First (manual low) | 2.45 | — | o | — | o | o |
| Reverse | 2.18 | o | — | — | o | — |

In the Table 1: "o" shows engagement of the friction element or locking of the one-way brake; and "—" shows disengagement or free relative rotations thereof.

In FIG. 1, no hydraulic control system actuating the friction elements are shown, however, a few of the functional members are shown. These are an engine driven fluid pump 101 and a governor valve assembly 112 and 113 which is connected to the output shaft 2.

FIG. 2 shows a hydraulic circuit diagram of a hydraulic control system which is adapted to control the power transmission mechanism shown in FIG. 1, according to one preferred embodiment of the present invention. The hydraulic control system comprises a fluid sump 100, the fluid pump 101, a line pressure regulator valve 102, a line pressure booster valve 103, a manual shift valve 104, a 1-2 shift valve 105, a 2-3 shift valve 106, a throttle valve 107, a throttle modulator valve 108, a kick-down valve 109, a timing valve 111, a first governor valve 112, a second governor valve 113, a line pressure cut down valve 114, a 2nd speed lock up valve 116, a torque converter relief valve 117, and a torque converter check valve 118 to effect desired automatic shifting between the above mentioned speed ratios by introducing predetermined line pressure to the friction elements. The control system further includes a torque converter oil cooler 119, a hydraulic servo 120 to engage the friction clutch 4 by introducing hydraulic pressure to the servo 118, a hydraulic servo 121 to actuate the friction clutch 5, a hydraulic servo 122 to actuate the friction brake 6, an engage side brake chamber 123 and a release side brake chamber 124 of the hydraulic servo 122, a hydraulic servo 125 to actuate the friction brake 7, and also as control components, an accelerator pedal 500, a carburetor throttle valve 501, a vacuum diaphragm unit 502, a kick-down switch 503 to actuate the throttle valve 107 and a kick-down solenoid 504, and further, actuating and controlling conduits and passages properly connecting the valves and components to provide desired hydraulic control of automatic transmission.

As a single hydraulic pressure source, actuating fluid of the hydraulic control system, working fluid of the torque converter 3 and lubricant fluid of the transmission mechanism are delivered by the positive displacement fluid pump 101 which is driven by the engine as shown in FIG. 1 and is adapted to draw fluid from the sump 100 through suction conduit 199 and to supply fluid under pressure to the above mentioned components through passage 200. The fluid pressure in the passage 200 is the main source for the hydraulic circuit and is mentioned as line pressure.

The line pressure through passage 200 is regulated by the line pressure regulator valve assembly 102 and 103 as will be described more fully hereinafter. Fluid under pressure which is supplied to the torque converter 3 from the passage 200 through the pressure regulator valve 102 and passage 216 is regulated by the torque converter relief valve 117 which prevents fluid pressure from increasing beyond a predetermined value. Fluid pressure in the torque converter 3 is maintained by the torque converter check valve 118, and the fluid passed through the check valve 118 is delivered through an oil cooler 119 to portions to be lubricated.

The manual shift valve 104 comprises a valve spool 320 which is operated by the vehicle operator to introduce line pressure in the passage 200 to passages 201 through 206 as shown in Table 2, according to the selected positions of the shift lever not shown.

TABLE 2

| Passage: | P | R | N | D | 2 | 1 |
|---|---|---|---|---|---|---|
| 201 | — | — | — | o | o | o |
| 202 | — | — | — | o | o | — |
| 203 | — | — | — | o | — | — |
| 204 | o | o | — | — | o | o |
| 205 | o | o | — | — | — | — |
| 206 | — | o | — | — | — | — |

In the Table 2: "o" shows communication of the passage to line pressure at the selected position; and "—" shows communication to an exhaust port at the selected position. The operation of the power transmission mechanism shown in FIG. 1 according to the selected positions P, R, N, D, 2 and 1 will be as follows.

P: The output shaft 2 is locked by a locking device not shown.
R: reverse drive,
N: neutral, power is not transmitted to output shaft 2,
D: forward drive, the transmission shown is shifted automatically between 1st, 2nd and 3rd speed ratios,
"2": lock in 2nd speed ratio,
"1": down shift from 2nd to 1st speed ratio and maintaining 1st speed ratio.

The manual shift valve spool 320 is shown in the neutral or position N in FIG. 2, thus blocking all operating passages from line pressure and communicating them to exhaust ports Ex which communicate to the sump 100 through passages not shown.

When the operator shifts the manual shift valve 104 to the automatic three speeds forward position D, passages 201, 202 and 203 communicate with the line pressure passage 200. The line pressure supplied through passage 201 actuates the hydraulic servo 121 to engage the friction clutch 5 all through the three speeds forward drive. Further passage 201 commuciates to the 1–2 shift valve 105 and the first governor valve 112. The line pressure through the passage 203 is supplied to the 2–3 shift valve 106.

The 1–2 shift valve 105 comprises a valve spool 326 which is biased by a spring 327 to keep the valve spool 326 in the rightward position as shown in FIG. 2 at 1st speed ratio and blocks the passage 201 from communication anywhere. Thus only the friction cultch 5 is engaged, the vehicle drives forward in 1st speed ratio as shown in Table 1 due to the engagement of the one-way brake 10. In this case, as one-way brake 10 is effective, the engine drives the wheels, but the wheels cannot drive the engine, so that an engine braking function is not effective owing to free rotation of the one-way brake 10. As the vehicle speed increases, governor pressure produced by the governor valve assembly 112 and 113, as will be explained in more detail hereinafter, through passage 220 urges the valve spool 326 leftward, so that passage 201 communicates to passage 211 to apply the engage side chamber 123 of the hydraulic servo 122 of the friction brake 6. Thus the friction brake 6 is engaged to attain 2nd speed ratio of the power transmission mechanism as shown in Table 1.

The 2–3 shift valve 106 comprises a valve spool 330 which is biased to the rightward position as shown in FIG. 2 by a spring 331 at 1st and 2nd speed ratios. As the vehicle speed further increases, governor pressure through passage 220 is increased sufficiently to urge the valve spool 330 leftward to communicate passage 203 to passage 214 through a groove of the valve spool 330. Line pressure through passage 214 is supplied to the hydraulic servo 120 to engage the friction clutch 4 and also to the release side chamber 124 of the hydraulic servo 122 to release the friction brake 6. By providing an area difference between the chamber 124 and 123, the friction brake is released when both chamber 124 and 123 are supplied by line pressure, so that a smooth shift process between the 2nd and 3rd speed ratios is attained. Thus as shown in Table 1 the power transmission mechanism shown in FIG. 1 is driven in 3rd speed ratio or in direct coupling.

When the operator selects the position "2" by shifting the manual shift valve 104, line pressure through passage 200 is supplied to passages 201, 202 and 204. Line pressures through passage 201, as selected position D, engages the friction clutch 5.

The 2nd speed lock up valve 116 comprises a valve spool 335 which is biased to the leftward position as shown in FIG. 2 by a spring 336 when passages 202 and 203 are both communicated to line pressure or an exhaust port, so that passages 211 and 212 are communicated. Thus when passage 211 is communicated to line pressure, the pressure is supplied to engage side chamber 123 of the hydraulic servo 1222 to engage the friction brake 6. When the position "2" is selected, passage 202 communicates to line pressure and passage 203 communicates to an exhaust port. Thus the valve spool 335 is urged rightward to communicate passage 202 to passage 212 so that line pressure is supplied to the engage side chamber 123 of the hydraulic servo 122 to engage the friction brake 6. Thus 2nd speed ratio is attained. The valve spool 335 maintains the rightward position throughout the selected position "2" and is not affected by vehicle operating conditions such as speed or throttle opening.

When the operator selects the position "1" by shifting the manual shift valve 104, line pressure through passage 200 is communicated to passages 201, 204 and 205. As before, line pressure through passage 201 acts to engage the friction clutch 5 all through the position "1." Line pressure through passage 205 communicates to passage 215 when the 1–2 shift valve 105 is in the rightward position as shown in FIG. 2, so that the line pressure actuates the hydraulic servo 125 to engage the friction brake 7, thus 1st speed ratio is obtained. If the 1–2 shift valve 105 is kept leftward by governor pressure through passage 220, when the manual shift lever selects the position "1" from other positions, passage 201 communicates through passage 211, the 2nd speed lock up valve 116 and passage 212 to engage side chamber 123 of the hydraulic servo 122 to engage the friction brake 6. Thus 2nd speed ratio is attained. By the position "1," passages 203 and 206 are exhausted so that 3rd speed ratio cannot be attained because the friction clutch 4 is not engaged. When the 1–2 shift valve 105 is urged to rightward, 1st speed ratio is attained as before, and line pressure through passage 215 urges the valve spool 326 from left end surface of the spool 326, so that 1st speed ratio is maintained. In this case, as the friction brake 7 is engaged, the planet carrier 27 of the rear planetary gear unit 9 is clamped to both directions, compared to the one-way brake 10 in the case of 1st speed ratio of the position D, so that an engine braking function can be obtained.

When the manual shift valve 104 is shifted to reverse drive position R, line pressure through passage 200 is supplied to passages 024, 205 and 206. Line pressure through passage 205 is applied to engage the friction brake 7 as before, and line pressure through passage 206 is communicated through the 2–3 shift valve 106 and passage 214 to the hydraulic servo 120 to engage the friction clutch 4. Thus as shown in Table 1, the output shaft 2 of the power transmission mechanism rotates in the reverse direction.

The governor valve assembly 112 and 113 is mounted to the output shaft 2 of the power transmission as shown in FIG. 1 and adapted to supply hydraulic pressure representing the vehicle speed to passage 220. The governor valve may be of any construction representing the vehicle speed. In the illustrated embodiment, line pressure through passage 201 is introduced in the first governor valve 112 which is constructed as a pressure regulator valve to produce increasing hydraulic pressure as a function of increasing rotational speed of the output shaft 2. The pressure which is determined by equilibrium between centrifugal force, spring bias pressure and hydraulic pressure is supplied through passage 219 to the second governor valve 113 constructed as a change-over valve and adapted to supply fluid pressure beyond a predetermined speed of the output shaft 2 of the vehicle to the passage 220. The governor pressure through passage 220 is supplied to the 1–2 shift valve 105 and the 2–3 shift valve 106 to urge the valve spools 326 and 330 respectively, as described before, when the vehicle speed exceeds respective predetermined values, so that communication passages of the line pressure are changed to effect automatic shifting between 1st through 3rd speed ratios. Also, the passage 220 is communicated to the right end surface of spool 401 of the line pressure cut-down valve 114 to regulate hydraulic pressure actuating the friction elements as will be explained in more detail hereinafter.

The kick down valve 109 comprises a valve spool 346 which is biased to the rightward position by a spring 347 to block communication between passages 200 and 209. Engaging the right end surface of the spool 346, the kick down solenoid 504 is provided. As the accelerator pedal 500 is depressed, the kick down switch 503 is closed to energize the solenoid 504 and actuate rod 348 to urge the valve spool 346 leftward, so that line pressure through passage 200 communicates to passage 209. Fluid pressure through passage 209 communicates to a groove between area difference lands 328 and 329 to urge the spool 326 rightward when the spool 326 is shifted leftward. Also, the passage 209 communicates to the left end surface of the spool 330 of the 2–3 shift valve 106 to urge the spool 330 rightward. Consequently, the valve spool 330 or 326 will move rightward when the urging force overcomes the biasing force of the governor pressure through passage 220, so that a down-shift from 3rd to 2nd or from 2nd to 1st speed ratio will be obtained.

To detect the engine torque, throttle opening or vacuum pressure in intake manifold of the engine may be available. In the illustrated embodiment, the engine torque is detected by vacuum pressure in the engine intake manifold. In the general gasoline engine, the engine torque is higher as vacuum pressure in the intake manifold is smaller. To detect the engine torque the vacuum pressure diaphragm unit 502 is provided to engage the right end surface of the throttle valve 107. When pressure in vacuum chamber 505 of the vacuum diaphragm unit 502 is equal to atmospheric pressure in chamber 506, throttle valve spool 342 is urged to leftward, and also, as the vacuum is increased in the chamber 505 the biasing pressure to the spool 342 is decreased. The throttle valve 107 regulates the line pressure through passage 200 by leaking a portion thereof to an exhaust port to produce a hydraulic pressure representing the urging force of the vacuum diaphragm unit 502 and also representing the engine torque to passage 207. The throttle pressure through passage 207 is supplied to the left end surfaces of the line pressure booster valve 103 and the throttle modulator valve 108 which is combined to the 2–3 shift valve 106 and to the right end surface of the second line pressure cut down valve 115 so that the valve spools are biased to regulate shift point or to regulate line pressure through passage 200.

The line pressure regulator valve assembly 102 and 103 consists of the line pressure regulator valve 102 comprising a spool 310 and a biasing spring 311 and the pressure booster valve 103 comprising a spool 313 which is assembled in line with the spool 310. Fluid pressure produced by the oil pump 101 is introduced through passage 200 between lands 314 and 315 of the spool 310 and urges the spool 310 leftward by the area difference between the lands 314 and 315 against the biasing spring 311. When the fluid pressure through passage 200 is higher than a predetermined value, the spool 310 is urged leftward to open communication between passages 200 and 216 and supply torque converter working fluid as previously mentioned. When the fluid pressure is further increased, the spool 310 moves leftward and land 317 thereof opens exhaust port to leak a portion of fluid and to reduce the hydraulic pressure in the passage 200. Thus, an equilibrium is produced between the hydraulic pressure force and the biasing spring force, and consequently, the fluid pressure in passage 200 is regulated to desired line pressure.

The line pressure booster valve biases the spool 310 of the regulator valve 102 by the spool 313 when fluid pressure is applied to left end surface of land 319 through passage 206, or between area difference lands 318 and 319 through passage 206, so that line pressure increases to attain equilibrium between the forces. On the contrary, when fluid pressure is applied to the right end surface of the spool 310 of the regulator valve 102 through passage 222 to urge the spool 310 leftward, the regulated line pressure through passage 200 is decreased correspondingly to attain equilibrium again.

The line pressure cut-down valve 114 comprises a valve spool 401 and a biasing spring 402. Governor pressure through passage 220 is applied to the right end surface of land 403 of the spool 401 to urge the spool 401 leftward against the spring force, and throttle pressure through passage 207 is applied between area difference lands 403 and 404 to urge the spool 401 rightward. Thus, when the force produced by governor pressure is larger than the force produced by the spring 402 and throttle pressure, spool 401 is urged leftward to communicate passages 207 and 222, and when governor pressure is lower, the passage 222 is exhausted. Consequently, when the governor pressure is sufficiently high, throttle pressure through passage 207 is applied to both end surfaces of the line pressure regulator valve assembly 102 and 103 and as the land 314 is smaller than the land 319, line pressure increases as throttle pressure or engine torque increases.

The timing valve 111, according to one embodiment of the present invention, comprises a valve spool 350 and a spring 351 to bias the spool 350 rightward. The timing valve 111 is disposed between the passage 213 communicating with the engage side fluid chamber 123 of the hydraulic servo 122 of the brake 6 and passage 212 communicating with the 1–2 shift valve 105 through the 2nd speed lock-up valve 116 and passage 211. When the spool 350 is in the rightward position shown in FIG. 2, passage 212 and 213 are communicated with each other. When the spool 450 is in the leftward position, passage 212 is blocked by land 352 and passage 213 is communicated to an exhaust port to decrease fluid pressure in the engage side fluid chamber 123 to effect rapid disengagement of the brake 6.

Passage 214 is communicated tot he right end surface of the spool 350. Passage 214 is a passage communicating the 2–3 shift valve 106 and hydrauic servo 120 actuate the clutch 4 and the release side fluid chamber 124 of the hydraulic servo 122 to disengage the brake 6. To the left end surface of the spool 350, passage 209 is communicated to normally communicating throttle pressure passage 207. A change-over valve 115 is disposed between passages 210 and 207. The change-over valve 115 is also communicated to passage 209 which communicates through passage 204 to the manual shift valve 104. Passage 204 is communicated to an exhaust port at position D and to line pressure at positions "2," "1" and R. Thus, passage 210 is communicated to throttle pressure through passage 207 at position D, and to line pressure through passage 209 at positions "2," "1" and R. As the left land 354 of the spool 350 is larger than the right land 352, the spool 350 is maintained in the rightward position at positions "2," "1" and R.

Thus, the spool 350 can be urged leftward only when the manual shift valve is at position D. When passage 214 is communicated to line pressure to actuate hydraulic servo 120 to engage the friction clutch 4 and to apply the release side fluid chamber 124 of the hydraulic servo 122 to disengage the friction brake 6 through the 2–3 shift valve 106, when throttle pressure through passages 207 and 210 is below a predetermined value, the valve spool 350 is urged to leftward, so that passage 212 is blocked by the land 352 and passage 213 is communicated to exhaust port through a groove between lands 352 and 353 of the spool 350. Thus, fluid pressure in the engage side fluid chamber 123 of the hydraulic servo 122 is decreased to effect quick disengagement of the friction brake 6.

Fluid pressure in the engage side fluid chamber 123 is also decreased at low throttle conditions while running at a 3rd speed ratio, so that at 3–2 downshift at a low throttle condition, fluid pressure in the engage side fluid chamber 123 is delayed to actuate the hydraulic servo 122 so that engagement timing of the friction brake 6 is delayed.

Operation of the timing valve 111 according to the present invention is as follows:

At 2–3 upshifting in a high engine torque operating condition, as throttle pressure through passage 207 is high enough to prevent displacement of the spool 350, disengagement of the friction brake 6 is determined by a spring force and fluid pressure caused by the area difference between both sides of the hydraulic servo 122, so that overlap of both engagement and disengagement of the friction elements is large, to forcibly slip the friction brake 6 and the friction clutch 4 to effect smooth upshifting at a high throttle condition.

At 2–3 upshifting under a low engine torque condition, as throttle pressure through passage 207 is sufficiently low, the valve spool 350 of the timing valve 111 is urged leftward as line pressure through passage 214 is increased, to exhaust through passage 212 the engage side fluid chamber 123 of the hydraulic servo 122. Thus the friction brake 6 is quickly disengaged, and overlap of both engagement of the clutch 4 and disengagement of the brake 6 is decreased and neutral timing by both is produced. Thus smooth upshifting without excess shocked is attained.

At 3–2 downshifting under a high engine torque condition, since throttle pressure through passage 207 is high enough to retain valve spool 350 in the rightward position, fluid pressure in the engage side fluid chamber 123 of the hydraulic servo 122 is communicated to line pressure through passage 213, the timing valve 111, passage 212, the 2nd speed lock-up valve 106, passage 211, the 1–2 shifts valve 105 and passage 201 prior to the shifting, so that an engagement function is performed as soon as passage 214 is exhausted. Thus engagement of the friction brake 6 is quick, and overlap of both engagement of the brake 6 and the clutch 4 is long enough to perform suitable shifting at a high engine torque condition.

At 3–2 downshifting under a low engine torque condition, since throttle pressure through passages 207 and 210 is sufficiently low to cause the valve spool 350 of the the timing valve 111 to be moved leftward by line pressure through passage 214 prior to the down-shift operation, the spool 350 is urged rightward after the down-shift due to the exhaust of fluid pressure from passage 214. Consequently, fluid pressure in the engage side fluid chamber 123 of the hydraulic servo 122 is communicated to an exhaust port prior to the down-shift and is pressurized after passage 214 is exhausted and passages 212 and 213 are communicated by rightward displacement of the spool 350 by the down-shift. Thus, engagement of the friction brake 6 is delayed, so that there is little overlap of both engagements and a neutral condition of both disengagement of the brake 6 and the clutch 4 is produced to effect smooth shifting suitable to low engine torque operating condition.

The above mentioned upshift and down-shift operations relate to automatic shifting at position D. At lower gear ratio position "2" line pressure is applied through kick-down passage 209, and as line pressure is higher than throttle pressure through passage 207, line pressure through passage 209 is applied to the left end surface of land 354 through the change-over valve 115 and passage 210 to retain the valve spool 350 in the right end position in spite of fluid pressure through passage 214. Thus whether at a low or high engine torque condition, no delay of engagement of the brake 6 is produced when the manual shift valve 104 is shifted from position D to "2," so that an engine braking operation is not delayed.

Another embodiment of the timing valve is shown in FIG. 3. In FIG. 3, other functional elements shown are similar to FIG. 2 for the sake of clarity, and the same reference numerals are used to show similar parts or portions so that a detailed description will not be necessary.

The timing valve 111' shown in FIG. 3 comprises a valve spool 350' and a spring 351' to bias the spool 350' rightward. To the right end surface of land 352' of the spool 350' governor pressure passage 220 is communicated, and to the left end surface of land 354' of the spool 350' again passage 210 is communicated to communicate higher fluid pressure through change-over valve 115 and throttle pressure passage 207 or kick-down pressure passage 209. Lands 352' and 354' are also provided with an area difference, so that when line pressure is applied to kick-down passage 209, the spool 350' is retained in the right end position, and when throttle pressure is applied to the spool 350', the spool 350' is urged leftward only when governor pressure through passage 220 is sufficiently higher than the throttle pressure through passage 207.

Also in this embodiment, passages 212 and 213 are communicated to the timing valve 111' to communicate passage 212 to the engage side fluid chamber 123 of the hydraulic servo 122 of the friction brake 6 when the spool 350' is in the right end position shown in FIG. 3. When governor pressure is sufficiently high as compared to throttle pressure, the valve spool 350' is urged leftward to block passage 212 by land 352' and to communicate passage 213 to an exhaust port, to decrease fluid pressure in the engage side fluid chamber 123 so that quick disengagement of the friction brake 6 is attained.

In the hydraulic control system shown in FIG. 3, an upshift characteristic is shown in FIG. 4 in relation to throttle pressure and vehicle speed, by way of example. By proper selection of the spool 350' and the spring 351', the spool 350' will be urged leftward so as to communicate passage 213 to an exhaust port at hatched portion shown in FIG. 4.

The operation of the timing valve 111' is as follows: At low vehicle speed and at high speed and high engine torque operating conditions, the urging force of the governor pressure through passage 220 is less than the spring force and counteracting throttle pressure by ratio of the area difference of the lands 352' and 354', so that valve spool 350' is retained in the right end position shown in FIG. 3 to maintain communication between passages 212 and 213. Thus, the friction brake 6 is not unexpectedly disengaged at 2nd speed ratio.

At high vehicle speed and low engine torque operating conditions, governor pressure exceeds the counteracting forces to urge the spool 350' leftward, so that passage 213 is communicated to an exhaust port.

Accordingly, at a 2–3 upshift under a high engine torque condition, the spool 350' of the timing valve 111' will not be displaced due to high throttle pressure. Thus, both side faces of the hydraulic servo 122 are communicated to line pressure, so that disengagement of the friction brake 6 is normally performed, causing overlap of both engagement of the brake 6 and the clutch 4 and is suitable to a high engine torque condition.

At 2–3 upshifting when the accelerator pedal 500 is rapidly released, the range is within the hatched portion shown in FIG. 4 and because of high vehicle speed and low throttle pressure, the valve spool 350' of the timing valve 111' is urged leftward to communicate passage 213 to an exhaust port. Thus fluid pressure in the engage side fluid chamber 123 of the hydraulic servo 122 of the friction brake 6 is decreased so that the brake 6 is quickly disengaged to cause a neutral condition of both disengagement of the brake 6 and the clutch 4. Consequently smooth upshifting without excess shock is performed.

This operating condition is shown in FIG. 4. While running in 2nd speed ratio and vehicle speed and throttle pressure shown as point A, when the accelerator pedal 500 is rapidly released, throttle pressure is decreased to point B. Thus by high governor pressure the spool 350' is urged leftward and passage 213 is exhausted. The point B is within 3rd speed range, that is, the valve spool 330 of the 2–3 shift valve 106 is urged leftward to communicate passages 203 and 214, so that line pressure through passage 214 is applied to the hydraulic servo 120 to engage the friction clutch 4 and to the release side fluid chamber 124 of the hydraulic servo 122 to disengage the friction brake 6, to attain 3rd speed ratio. As the engage side fluid chamber 123 is communicated to an exhaust port and line pressure through passage 212 is blocked by land 352' of the spool 350' owing to the displacement of the spool 350', disengagement of the friction brake 6 is quickly performed. Thus a neutral condition of both disengagement of the brake 6 and the clutch 4 is caused, which is suitable to perform smooth shifting at a low throttle pressure operating condition.

At manually selected positions "2" and "1," passage 204 is communicated to line pressure and through the kick-down valve 109, passage 209, the change-over valve 115, and passage 210 to the left end surface of the spool 350', so that the spool 350' is retained in the rightward position shown in FIG. 3. Thus, passage 213 is not exhausted so that the friction brake 6 is not unexpectedly released. Further, as shown in FIG. 4, passage 213 is exhausted only in 3rd speed ratio, since the 3–2 downshift line displaces further to lower speed, the friction brake 6 is not released at 2nd speed ratio.

It will be appreciated that, by providing the timing valve 111 or 111' according to the present invention, at 2–3 shifting at a low engine torque operating condition, the friction brake 6 is quickly disengaged to cause minimum overlap or neutral condition of both disengagement of the friction brake 6 and the clutch 4. Thus, the output shaft 2 is not arrested and smooth shifting is performed without any excess shock or noise. And also, by introducing line pressure through passage 204 through change-over valve 115, no adverse effect is produced at manual shifting to lower speed ratios. Thus, by the hydraulic control system according to the present invention, a smooth shifting operation all through the operating conditions of the vehicle is performed by regulating the timing relation of engagement and disengagement of the friction elements according to the present invention.

What is claimed is:

1. A hydraulic control system for an automatic transmission mechanism for vehicles, said transmission having an input and an output shaft, at least one planetary gear unit disposed between said shafts, and a plurality of friction elements, including a first and a second friction element, connected to said planetary gear unit to obtain a plurality of gear ratios by selectively engaging said friction elements by hydraulic pressure produced in said hydraulic control system, said gear ratios including at least a higher and a lower forward gear ratio, said hydraulic control system comprising, a fluid pump for producing line pressure, a line pressure passage means connected to said fluid pump for distributing said line pressure, a line pressure regulator means connected to said line pressure passage means for regulating said line pressure, a manual shift valve for manually controlling distribution of line pressure, said manual shift valve having at least a higher and a lower forward gear ratio position, a plurality of hydraulic servo means for actuating said friction elements upon the introduction of line pressure to said servo means, shift valve means connected to said fluid pressure passage means for controlling distribution of line pressure to said servo means, said hydraulic servo means including a first hydraulic servo for actuating said first friction element to obtain said higher gear ratio and a second hydraulic servo for actuating said second friction element to obtain said lower gear ratio, said second hydraulic servo including an engage side fluid chamber and a release side fluid chamber, said release side fluid chamber acting to release said friction element when line pressure is applied to said both chambers, a first fluid passage means communicating said release side fluid chamber of said second hydraulic servo to said first hydraulic servo, a second fluid passage means communicating said shift valve means with said engage side fluid chamber of said second hydraulic servo, a timing valve means disposed in said second fluid passage means, an exhaust port located in said timing valve means, said timing valve means having a first position to communicate said second fluid passage means with said shift valve means for applying line pressure to said second passage means and a second position to communicate said first passage means to said exhaust port, throttle valve means communicating with said line pressure passage means for producing throttle pressure representing engine torque, throttle pressure passage means communicating said throttle valve means with said timing valve means to bias said timing valve to said first position, said first passage means further communicating with said timing valve means to bias said valve to said second position, whereby said timing valve means is moved to said second position when upshifting to said higher gear ratio by applying line pressure to said first passage means and the throttle pressure is of a low value for obtaining rapid disengagement of said second friction element by communicating said engage side fluid chamber to said exhaust port.

2. A hydraulic control system as claimed in claim 1, further comprising, a third passage means communicating said line pressure to said timing valve to bias said valve to said first position when said manual shift valve is manually placed in a lower gear ratio position.

3. A hydraulic control system for an automatic transmission for vehicles, said transmission mechanism having an input and an output shaft, at least one planetary gear unit disposed between said shafts, and a plurality of friction elements connected to said planetary gear unit for obtaining a plurality of gear ratios by selectively engaging and disengaging said friction elements by hydraulic pressure produced in said hydraulic control system, said friction elements including a first friction element for obtaining a higher gear ratio and a second friction element for obtaining a lower gear ratio, said hydraulic control system comprising, a fluid pump for producing a line pressure, a line pressure passage means connected to said fluid pump for distributing said line pressure, a line pressure regulator valve connected to said line pressure passage means for regulating said line pressure, a manual shift valve for manually controlling distribution of line pressure, said manual shift valve having at least a higher and a lower forward gear ratio position, a plurality of hydraulic servo means for actuating said friction elements upon the introduction of line pressure to said servo means for actuating said friction elements upon the introduction of line pressure to said servo means, throttle valve means connected to said line pressure passage means for producing throttle pressure representing engine torque, governor valve means connected to said line pressure passage means for producing governor pressure representing vehicle speed, shift valve means connected to said line pressure passage means for controlling distribution of line pressure to said servo means, said hydraulic servo means including a first hydraulic servo means for actuating said first friction element to obtain said higher gear ratio and a second hydraulic servo for actuating said second friction element to obtain said lower gear ratio, said second hydraulic servo including an engage side fluid chamber for applying said second friction element and a release side fluid chamber for releasing said second friction element when line pressure is applied to both said first and said second chamber, a first passage means communicating said release side fluid chamber of said second hydraulic servo with said first hydraulic servo, a second fluid passage means communicating with shift valve means and said engage side fluid chamber of said second hydraulic servo, a timing valve means disposed in said second passage means, said timing valve means having a first position for communicating said shift valve means with said engage side fluid chamber and a second position for blocking communication of said shift valve means and said engage side chamber and communicating said engage side fluid chamber to an exhaust port, throttle pressure passage means communicating said throttle valve means with said timing valve means to bias said timing valve means to said first position, governor pressure passage means connecting said governor valve means with said timing valve means to bias said timing valve means to said second position, whereby, when the pressure in said governor pressure passage means is increased when upshifting to said higher gear ration and the throttle pressure in said throttle pressure passage is low, said timing valve means is biased to said second position to exhaust the engage side fluid chamber of said second hydraulic servo means to obtain rapid disengagement of said second friction element.

4. A hydraulic control system as claimed in claim 3, further comprising, a third passage means connecting said manual shift valve with said timing valve means to apply line pressure thereto to bias said timing valve to said first position when said manual shift valve is placed in said lower gear ratio position.

References Cited
UNITED STATES PATENTS

| | | | |
|---|---|---|---|
| 3,310,991 | 3/1967 | Leonard | 74—869X |
| 3,362,261 | 1/1968 | Snyder et al. | 74—869X |
| 3,393,585 | 7/1968 | Pierce, Jr. | 74—869X |
| 3,394,622 | 7/1968 | Chama | 74—867 |
| 3,446,098 | 5/1969 | Searles | 74—869 |

ARTHUR T. McKEON, Primary Examiner

U.S. Cl. X.R.

74—763